United States Patent
Bono et al.

(10) Patent No.: US 10,536,522 B2
(45) Date of Patent: Jan. 14, 2020

(54) DATA STORAGE SYSTEM WITH LUN ARCHIVING TO CLOUD USING VOLUME-TO-OBJECT TRANSLATION

(71) Applicant: EMC IP Holding Company LLC, Hopkinton, MA (US)

(72) Inventors: Jean-Pierre Bono, Westborough, MA (US); Sudhir Srinivasan, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 62 days.

(21) Appl. No.: 15/966,366

(22) Filed: Apr. 30, 2018

(65) Prior Publication Data

US 2019/0334984 A1    Oct. 31, 2019

(51) Int. Cl.
*G06F 15/173*    (2006.01)
*H04L 29/08*    (2006.01)

(52) U.S. Cl.
CPC ................. *H04L 67/1095* (2013.01)

(58) Field of Classification Search
CPC .................................................. H04L 67/1095
USPC .......................... 709/217, 219, 223, 226, 229
See application file for complete search history.

(56) References Cited

U.S. PATENT DOCUMENTS

| | | | |
|---|---|---|---|
| 8,650,359 B2 | 2/2014 | Vaghani et al. | |
| 9,053,109 B1 | 6/2015 | Joshi et al. | |
| 9,208,181 B2 | 12/2015 | Pandey et al. | |
| 9,372,809 B2 | 6/2016 | Testardi et al. | |
| 9,430,513 B1 | 8/2016 | Iyangar et al. | |
| 9,588,977 B1 | 3/2017 | Wang et al. | |
| 10,326,837 B1* | 6/2019 | Bono | H04L 67/1095 |
| 2012/0084524 A1 | 4/2012 | Gokhale et al. | |
| 2012/0089781 A1 | 4/2012 | Ranade et al. | |
| 2014/0006354 A1* | 1/2014 | Parkison | G06F 3/0611 707/649 |
| 2014/0149794 A1* | 5/2014 | Shetty | H04L 67/1095 714/20 |
| 2014/0223576 A1* | 8/2014 | Zhao | H04L 67/10 726/27 |
| 2014/0304473 A1* | 10/2014 | Zachariassen | G06F 12/0897 711/122 |
| 2015/0033220 A1* | 1/2015 | Venkat | G06F 9/45541 718/1 |
| 2015/0052392 A1* | 2/2015 | Mickens | G06F 11/2069 714/15 |

(Continued)

FOREIGN PATENT DOCUMENTS

WO    2018011914    1/2018

*Primary Examiner* — Liang Che A Wang
(74) *Attorney, Agent, or Firm* — BainwoodHuang

(57) ABSTRACT

Archiving local logical units of data storage (LUNs) to cloud storage, wherein the local LUNs reside on local physical storage of a data storage system, includes establishing a mirror between a local LUN and a cloud-backed LUN backed by cloud physical storage of a cloud storage system, the mirror making data contents of the cloud-backed LUN identical to data contents of the local LUN. Once the mirror is established, then (a) a stub is deposited on the local LUN to direct subsequent IOs to the cloud-backed LUN, and (b) local physical storage of the local LUN is released for allocation to other local LUNs. Subsequent IOs to the local LUN are satisfied from the cloud-backed LUN. An archived LUN can be restored by a restore process.

20 Claims, 5 Drawing Sheets

(56) References Cited

U.S. PATENT DOCUMENTS

| | | | |
|---|---|---|---|
| 2015/0186538 A1* | 7/2015 | Yan | G06F 16/14 |
| | | | 707/722 |
| 2015/0350326 A1* | 12/2015 | Shetty | H04L 67/1095 |
| | | | 707/825 |
| 2016/0034481 A1 | 2/2016 | Kumarasamy et al. | |
| 2016/0292040 A1 | 10/2016 | Kumarasamy | |
| 2019/0082009 A1* | 3/2019 | Gupta | H04L 67/1097 |

* cited by examiner

DATA STORAGE SYSTEM WITH LUN ARCHIVING TO CLOUD USING VOLUME-TO-OBJECT TRANSLATION

BACKGROUND

The present invention relates to the field of data storage systems used for secondary storage of data in computer systems. More particularly, it relates to data storage systems using cloud-based storage for storing data of locally defined storage elements such as logical units (LUNs).

SUMMARY

In modern computer systems it can be desirable to use data storage services available from so-called "cloud" providers, whose economies of scale help them provide very cost-effective and reliable remote data storage. The present disclosure is directed to a technique that stores certain data to "the cloud" (i.e., a remote storage system having a general-purpose, object-focused interface) using certain procedures, along with the ability to restore data from the cloud back to local storage. More particularly, it is directed to cloud-based archiving of inactive LUNs to the cloud while preserving/enabling attributes/features such as the following:
1) Once a LUN is archived, associated local storage can be released/reclaimed which effectively creates more free space in the local storage for creating new LUNs or to be used for other existing LUNs
2) An archived LUN can still be available to applications, with the expectation that very few IOs will be directed to it as it is indeed meant to be inactive
3) Writes against an archived LUN are cached locally and, out of band relative to host IOs, propagated to the cloud through a cloud appliance
4) Reads against an archived LUN are fetched from the cloud thru the cloud appliance More particularly, a computer-implemented method is disclosed of archiving local logical units of data storage (LUNs) to cloud storage, the local LUNs residing on local physical storage of a data storage system. The method includes establishing a mirror between a local LUN and a cloud-backed LUN backed by cloud physical storage of a separate cloud storage system, the mirror making data contents of the cloud-backed LUN identical to data contents of the local LUN. Upon the mirror being established, then the method (a) deposits a stub on the local LUN, the stub indicating that the local LUN has been archived and identifying the cloud-backed LUN as the target of subsequent IOs to the local LUN, and (b) releases local physical storage of the local LUN for allocation to other local LUNs. For subsequent IOs to the local LUN, based on the presence of the stub, the IOs are satisfied from the cloud-backed LUN.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
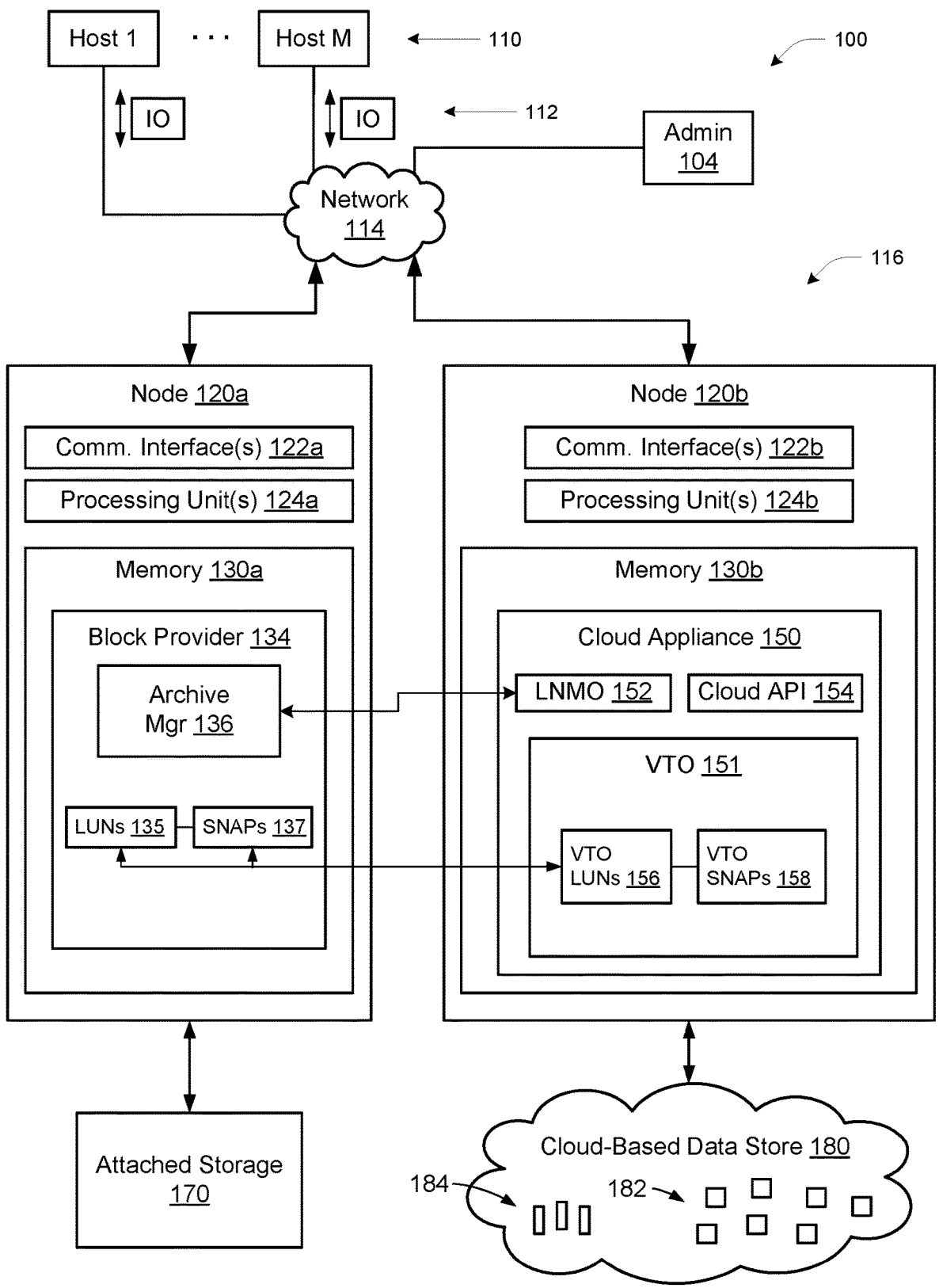
FIG. 1 is a block diagram of a data storage system.

FIG. 1 shows an example environment 100 in which embodiments of the improved technique hereof can be practiced. Here, multiple host computing devices ("hosts") 110 access a data storage system 116 over a network 114. An administrative machine 104 may also connect to the data storage system 116 over the network 114. The data storage system 116 may include any number of computing nodes, with two nodes 120a and 120b specifically shown. The first node 120a is configured to process host I/O requests 112, such as read requests and write requests, and is coupled to attached storage 170, such as one or more magnetic disk drives, solid-state drives, and the like. In an example, the first node 120a is connected to the attached storage 170 using cables or via a SAN (storage area network). The second node 120b is configured to access cloud storage and is coupled to a cloud-based data store 180, e.g., over a WAN (wide area network), such as the Internet. The cloud-based data store 180 may be part of a public cloud or a private cloud and may be provided by any suitable platform, such as Amazon Cloud Services (ACS), Microsoft Azure, Dell EMC Elastic Cloud Services (ECS), and the like. In an example, the cloud-based data store 180 stores data in the form of objects 182 and supports the storage of searchable metadata elements 184. For example, the cloud-based data store 180 supports the storage of searchable blobs in which the searchable metadata elements 184 may be provided. However, the invention hereof is not limited to object-based data or to data stores that provide blobs. As generally known, the objects 182 are user-defined units of data, each having a size as well as a unique identity. The relationship of objects 182 to internal data structures of the data storage system 116, such as volumes, LUNs, blocks, etc. is defined by the data storage system 116, and in particular by a volume-to-object (VTO) translator 151 described more below.

Each of the nodes 120a and 120b includes a set of communication interfaces (122a or 122b), such as one or more network interface adapters for converting electronic and/or optical signals received over the network 114 to electronic form for use by the respective node. Each of the nodes 120a and 120b further includes a set of processing units (124a or 124b) and memory (130a or 130b). Each set of processing units 124a and 124b includes one or more processing chips and/or assemblies. In a particular example, each set of processing units includes numerous multi-core CPUs. Each of the memories 130a and 130b includes both volatile memory (e.g., RAM), and non-volatile memory, such as one or more ROMs, disk drives, solid state drives, and the like. In each node 120, the set of processing units and the memory together form control circuitry, which is constructed and arranged to carry out various methods and functions as described herein. Each of the memories 130a and 130b includes a variety of software constructs realized in the form of executable instructions. When the executable instructions are run by the respective set of processing units 124a or 124b, the set of processing units are made to carry out the operations defined by the software constructs. Although certain software constructs are specifically shown and described, it is understood that each memory typically includes many other software constructs, which are not shown, such as various applications, processes, and daemons. Further, one should appreciate that the use of two nodes 120a and 120b is merely illustrative, as the data storage system 116 may include any number of nodes, including a single node.

As further shown in FIG. 1, the memory 130a of node 120a "includes," i.e., realizes by execution of software instructions, a block provider 134 including an archive manager (Archive Mgr) 136. The block provider 134 maintains logical units of storage (LUNs) 135 and makes them available to the hosts 110 for secondary data storage. The archive manager 136 provides for archiving the LUNs 135 to cloud storage. The LUNs 135 and snaps 137 are typically "locally backed", i.e., utilize the attached storage 170 for underlying physical storage for the LUNs 135 and snaps 137, as distinct from "cloud-backed" elements that utilize the cloud-based data store 180 as described more below. Archiving includes copying LUN data to the cloud-based data store 180 and then deallocating the local storage. Further structure and operation of the block provider 134 is provided below. The memory 130a may include any number of such block providers 134.

Although not shown in FIG. 1, the data storage system 116 may also include one or more additional nodes functioning as network attached storage (NAS) nodes, which may themselves be clients of the block provider 134 utilizing block storage provided thereby. As generally known, a NAS node serves as a network-based extension of a host-based file system and utilizes a file-system access protocol in communicating with the hosts 110 via the network 114. Examples of such protocols include Common Internet File System (CIFS) and Server Messaging Block (SMB). Such a NAS node may be loosely coupled to the block provider 134 (e.g., via network 114) or much more tightly coupled, e.g., by physical memory of a single compute server hosting both the NAS node and block provider 134 as respective virtual machines.

The memory 130b of node 120b includes a cloud appliance 150 that further includes a volume-to-object (VTO) translator 151 (also referred to herein as VTO 151), a LUN maintenance & orchestration (LNMO) unit 152, and one or more cloud APIs (application program interfaces) 154, for managing communications with the cloud-based data store 180. The VTO translator 151 is configured to compose block-based volumes from respective sets of objects 182 in the data store 180. Example block-based volumes are shown as VTO LUNs 156 and VTO Snaps 158, analogous to the local LUNs 135 and snaps 137 of the block provider 134. In operation, the VTO 151 associates volumes with corresponding sets of the objects 182. The VTO 151 is further configured to support object sharing among volumes, such that the same object 182 may be part of multiple volumes, e.g., if the corresponding data across the volumes are identical. The VTO 151 is still further configured to support snapshot operations. For instance, the VTO 151 may generate a snapshot of a volume as a point-in-time version of that volume. Owing to the object sharing, the volume and its snapshot may share most if not all of the objects that support them. Additionally, objects are generally shared among multiple distinct snapshots of the same volume. The VTO translator 151 preferably stores mapping structures for organizing data of volumes in objects 182, as well as the data itself. A suitable VTO translator that includes these features is commercially available from Dell EMC of Hopkinton, Mass., as part of the CloudArray appliance.

The cloud appliance 150 is configured to query the data store 180 based on searchable metadata elements 184. For example, the VTO translator 151 associates each of the searchable metadata elements 184 with a corresponding volume. For instance, a different searchable metadata element 184 may be provided for each volume managed by the VTO translator 151. As described below, the searchable metadata elements 184 include information that identifies LUNs and versions thereof with which particular VTO volumes are associated.

In example operation, node 120a in the data storage system 116 receives I/O requests 112 from hosts 110 (or from a separate NAS node, as mentioned above). The I/O requests 112 include read requests and/or write requests directed to the LUNs 135 (and in some cases, to the snaps 137). The block provider 134 satisfies the requests by accessing the underlying physical storage. For active, non-archived ("production") LUNs 135, this means accessing the local attached storage 170. In other cases, it may be necessary to access other physical storage, such as the cloud-based data store 180 via the cloud appliance 150. Typically, the block provider 134 implements some type of caching to decouple individual reads and writes from the attached storage 170, as generally known in the art.

The connections between the block provider 134 and the cloud appliance 150 include both a data transfer channel as well as a control channel. The data transfer channel preferably employs a block storage protocol such as iSCSI, and this particular example is assumed in the remaining description. The control channel is structured for more general-purpose communications such as exchanging out-of-band requests and corresponding responses. The control channel may employ an interface using so-called RESTful techniques, where REST refers to "representational state transfer" as generally known in the art. As with the connections to a separate NAS node as described above, the block provider 134 and cloud appliance 150 may be loosely coupled, e.g., over an external network 114, or they may be much more tightly coupled such as within a single VM server computer.

Figure 2:
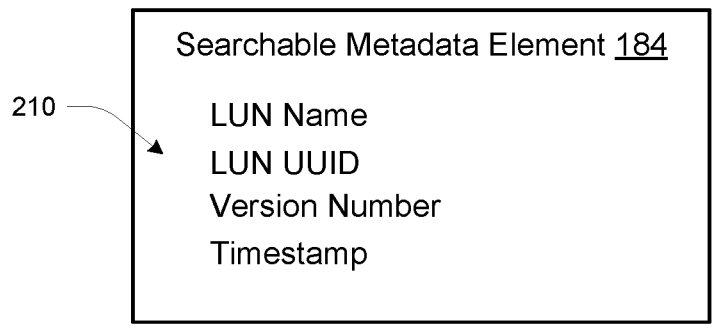
FIG. 2 is a schematic diagram of metadata.

FIG. 2 shows example information 210 that the VTO translator 151 may store in a searchable metadata element 184. The information 210 may be stored as different fields or in any suitable way, which may depend upon the features provided by the particular type of cloud-based data store 180 being used. In an example, a different searchable metadata element 184 is created for each snapshot generated pursuant to a group snapshot operation. In a non-limiting example, each searchable metadata element 184 includes the following information:

LUN Name. The name of the production LUN 135 associated with this volume (VTO LUN 156 or VTO Snap 158).

LUN UUID. A universally unique identifier of the LUN.

Version Number. A number that is incremented with each snapshot operation and indicates a version number of the LUN.

Timestamp. A time and date when the snapshot operation producing this snapshot was performed.

Some of the information 210 in the searchable metadata element 184 may be provided for operational convenience rather than out of necessity. Information may be helpful during restore operations and/or for supporting various types of queries. For example, administrators may query searchable metadata elements 184 based on any of the information 210. Querying based on Timestamp, for example, allows administrators to restore to a particular point in time, such as before a known corruption event. The VTO translator 151 may associate searchable metadata elements 184 with respective snapshots or archives in a variety of ways, such as in mapping metadata in the data store 180, in predefined storage regions, or in any suitable manner.

Figure 3:
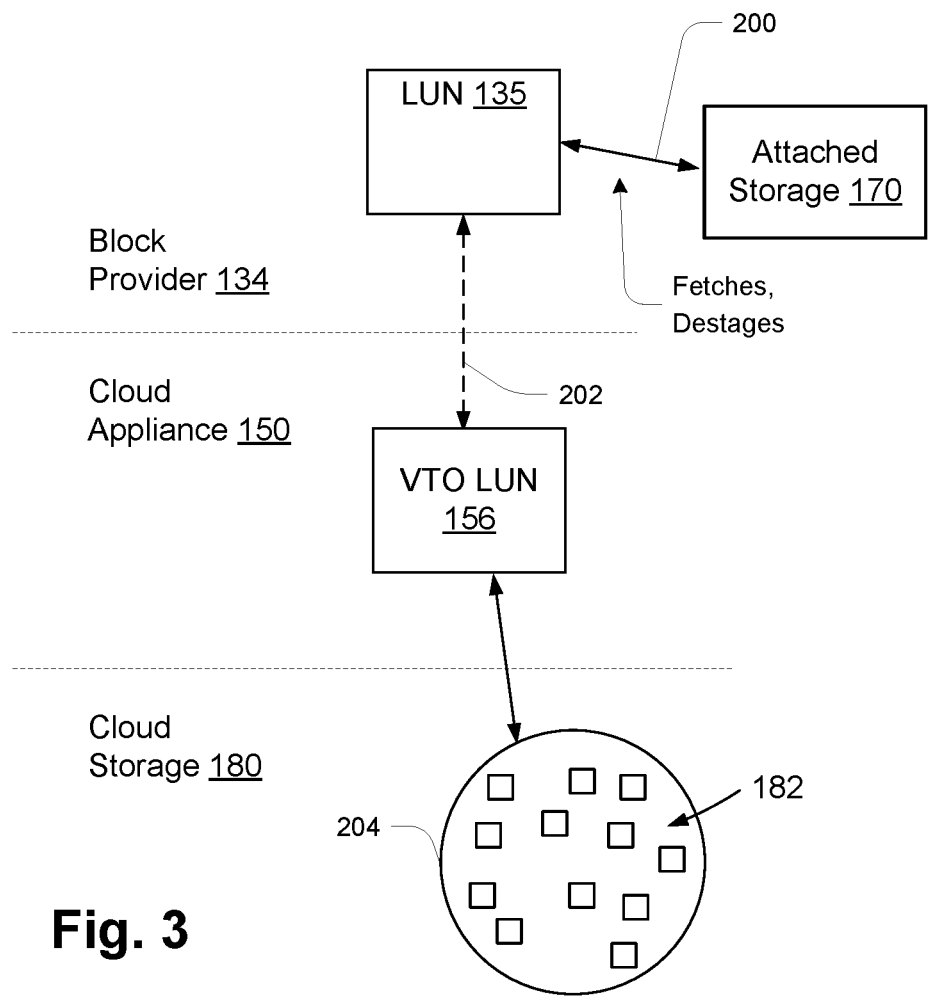
FIG. 3 is a schematic diagram of relationships between a local LUN and a corresponding cloud-backed LUN, just after initiation of an archiving process.

FIG. 3 shows more detailed aspects of the block provider 134 and cloud appliance 150 as they relate to creating cloud-based archives of local LUNs 135. This diagram depicts a situation after a cloud-based VTO LUN 156 has been created, which is part of the archive process as described more below. A local LUN 135 has associated local storage of the attached storage 170, indicated by a functional connection 200, and also has a separate functional connection 202 to a corresponding VTO LUN 156, which is backed by a set 204 of objects 182. In this operating state, the archiving is not complete, and thus the IOs directed to the local LUN 135 are still serviced with respect to the attached storage 170. This is shown by the indication that data fetches and de-stages occur on the connection 200. The connection 202 is a mirror connection over which the data of the local LUN 135 is being copied to the archive VTO LUN 156, as described more below.

Figure 4:
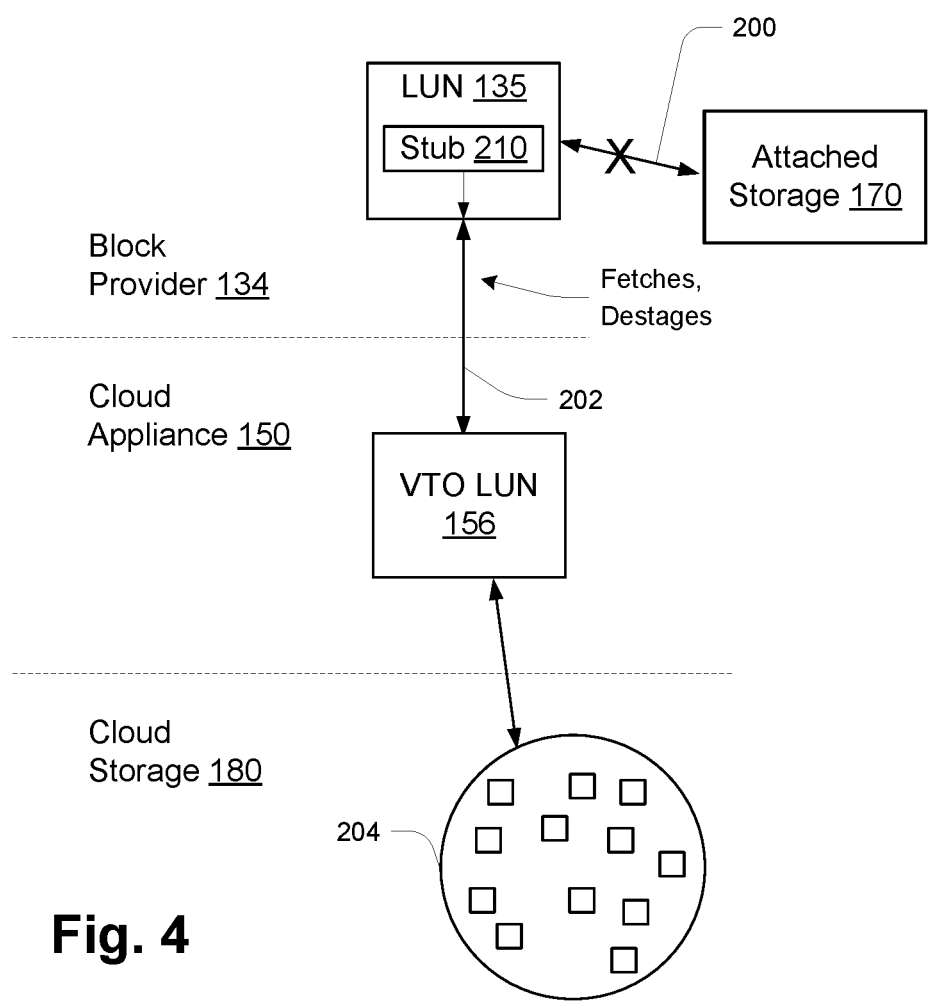
FIG. 4 is a schematic diagram of relationships between a local LUN and a corresponding cloud-backed LUN, upon completion of the archiving process.

FIG. 4 shows the arrangement of FIG. 3 at a later time, after archiving is complete. A pointer referred to as a "stub" 210 has been deposited on the local LUN 135, and the functional connection 200 to the attached storage 170 has been deactivated. The underlying physical storage is now provided by the VTO LUN 156, and the stub 210 points to the VTO LUN 156. IOs directed to the local LUN 135 are now serviced with respect to the VTO LUN 156. Although this type of access is generally much slower, thus affecting performance, it is assumed that any such IOs are very infrequent at best, given that the LUN 135 has been archived. The system preferably monitors usage of archived LUNs 135, and if they begin experiencing more usage, a decision can be made to restore the LUN to non-archived status. A process for such restoring is described below.

Figure 5:
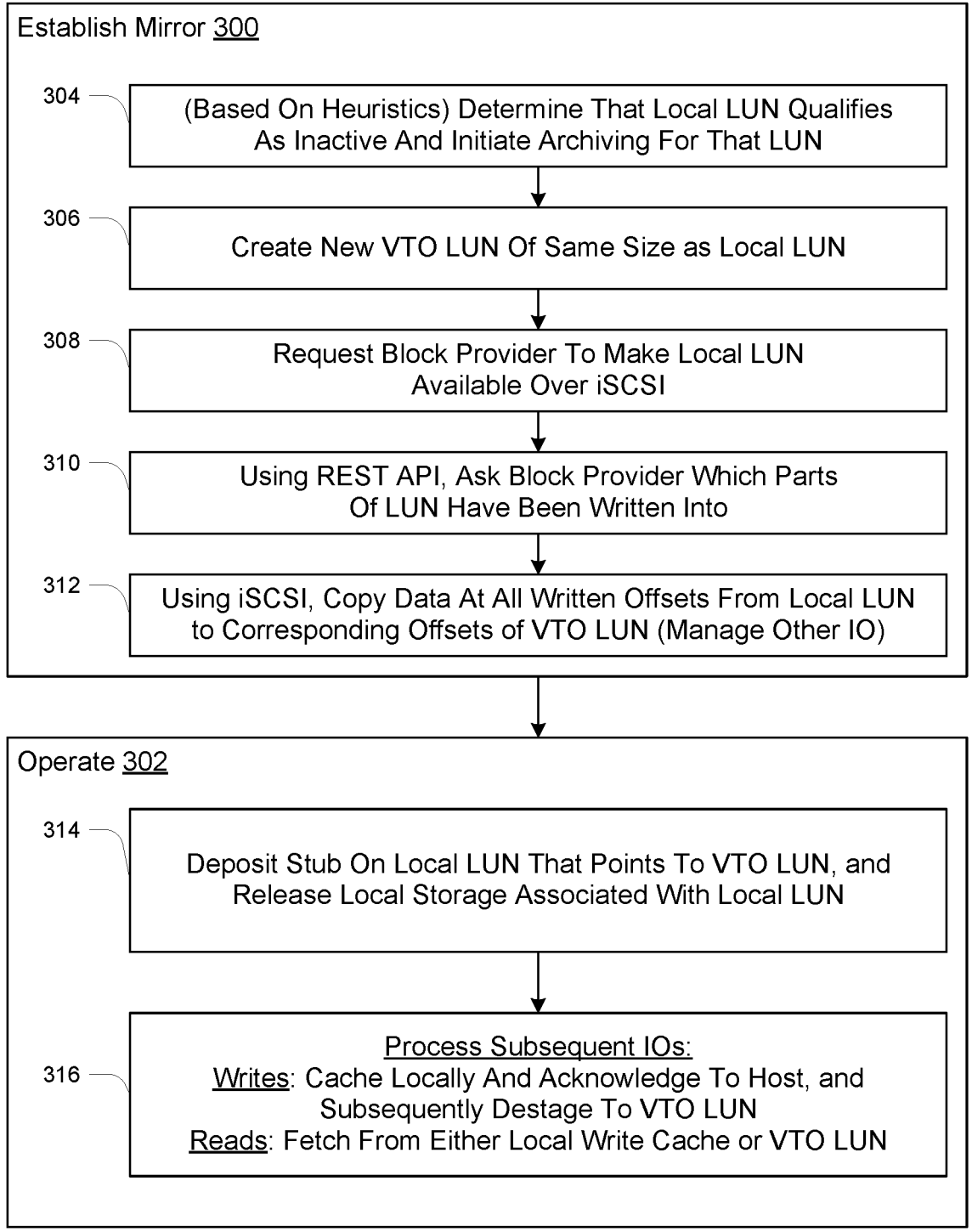
FIG. 5 is a flow diagram for a LUN archiving operation.

FIG. 5 illustrates a LUN archiving process. The process is initiated and primarily controlled by action of the LNMO 152 of the cloud appliance 150. It may be done in accordance with a predetermined schedule or some other policy, such as monitoring usage and seeing it fall below some threshold. In alternative embodiments, initiation and/or control may involve other actors, including for example the block provider 134 and/or an external agent such as the admin 104.

The process is shown as having two major operations, establishing a mirror at 300 and subsequent ongoing operation ("Operate") at 302.

In the mirror-establishing process 300, at 304 it is determined, based on heuristics, that a LUN 135 qualifies as inactive, and archiving process for this LUN is initiated.

At 306, a VTO LUN of the same size as the local LUN 135 to be archived is created.

At 308, the LNMO 152 requests the block provider 134 to make the LUN 135 available over iSCSI.

At 310, the LNMO 152 requests (using a REST request) from the block provider 134 a map of the offsets within the LUN 135 that have been written into.

At 312, the LNMO 152 orchestrates a copy of the LUN 135 into the VTO LUN 156, which establishes and uses a mirror connection between them. During the copy process, IOs to the LUN 135 must be managed in some manner to maintain consistency. In one approach, a determination is made whether an IO should be applied to both the source LUN 135 and the VTO LUN 156 or to just the source LUN 135, depending on the offset of the IO relative to where the cursor of the copy is. If the offset has already been copied, then any update to that offset must be mirrored to the VTO LUN 156.

In subsequent operation 302, at 314, LNMO 152 deposits the stub 210 on the local LUN 135 that points to the VTO LUN 156, and the local storage (of attached storage 170) associated with the local LUN 135 is released, i.e., made available for allocation to other LUNs.

At 316, subsequent IOs are processed with respect to the VTO LUN 156. Writes to the archived LUN 135 are cached locally and acknowledged to the host, and subsequently destaged to the VTO LUN 156. Reads to the archived LUN 135 are fetched from either the local write cache (if the offset is stored there) or obtained from the VTO LUN 156.

Figure 6:
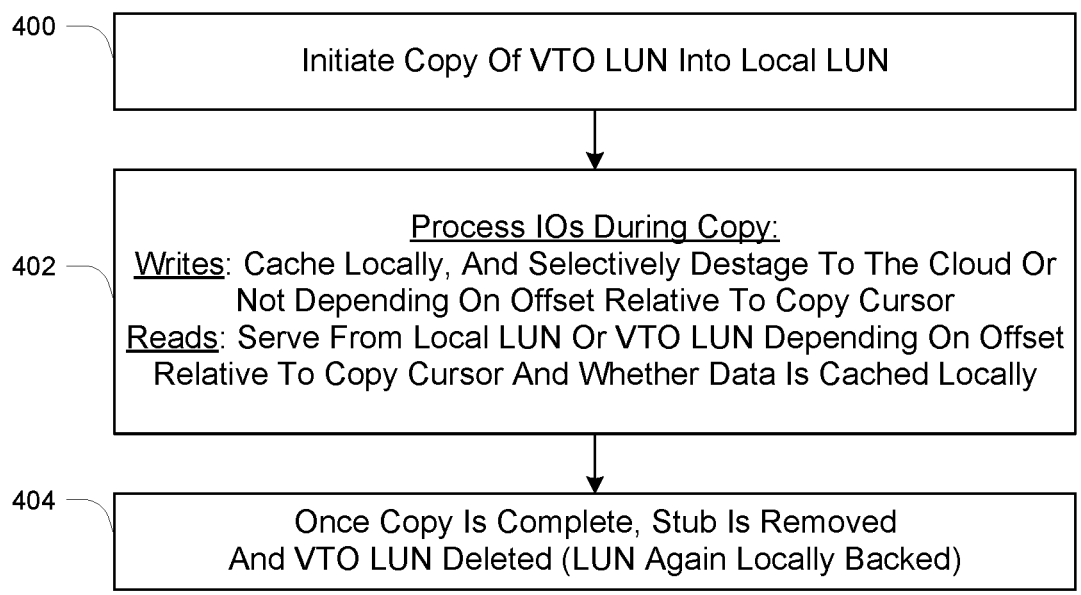
FIG. 6 is a flow diagram for a LUN restoring operation.

FIG. 6 illustrates operations of restore process or workflow, which accesses a stored cloud-backed VTO LUN 156 to restore a production LUN 135. As mentioned, this restore process may be used when access frequency has increased to a point of requiring the lower-latency, higher-bandwidth access provided by using the attached storage 170 rather than the cloud storage 180.

At 400, LNMO 152 initiates a copy of the VTO LUN 156 into the local LUN 135.

At 402, IOs occurring during the copying are processed. Writes are cached locally, and are selectively destaged to the VTO LUN 156 or not depending on the offset relative to the copy back cursor. Reads are served from either the local LUN 135 or the VTO LUN 156 depending on the offset relative to the copy back cursor and whether the data might have been cached locally.

At 404, once the copy is complete, the stub 210 is removed and the corresponding VTO LUN 156 is deleted. At this point the LUN 135 is again locally backed and ready for full performance usage.

While various embodiments of the invention have been particularly shown and described, it will be understood by those skilled in the art that various changes in form and details may be made therein without departing from the scope of the invention as defined by the appended claims.

What is claimed is:

1. A method of archiving local logical units of data storage (LUNs) to cloud storage, the local LUNs residing on local physical storage of a data storage system, comprising:

establishing a mirror between a local LUN and a cloud-backed LUN backed by cloud physical storage of a separate cloud storage system, the mirror making data contents of the cloud-backed LUN identical to data contents of the local LUN;

upon the mirror being established, then (a) depositing a stub on the local LUN, the stub indicating that the local LUN has been archived and identifying the cloud-backed LUN as the target of subsequent IOs to the local LUN, and (b) releasing local physical storage of the local LUN for allocation to other local LUNs; and for subsequent IOs to the local LUN, based on the presence of the stub, satisfying the IOs from the cloud-backed LUN, and further including steps of a restore process by which a production local LUN is restored from a corresponding cloud-backed LUN, the steps including:

initiating a copy of the cloud-backed LUN into the local LUN;

processing IOs during the copy, including (1) caching writes locally and selectively destaging write data to the cloud-backed LUN depending on an offset address of the write data relative to a copy cursor using in the copy process, and (2) serving reads from either the local LUN or the cloud-backed LUN based on an offset address relative to the copy back cursor and whether the read data has been cached locally; and once the copy is complete, removing the stub from the local LUN and deleting the cloud-backed LUN, making the local LUN locally backed and ready for full performance usage.

2. The method of claim 1, wherein the cloud storage system supports storage of searchable metadata elements usable to associate cloud-backed LUNs with corresponding LUNs of the data storage system.

3. The method of claim 2, wherein each searchable metadata element for a respective cloud-backed LUN includes a LUN name, a LUN identifier, a version number, and a timestamp, the LUN name being a name of the local LUN corresponding to the cloud-backed LUN, the LUN identifier being an identifier of the local LUN, the version number indicating a version of the local LUN, and the timestamp including a date and time when the cloud-backed LUN was created.

4. The method of claim 1, wherein the data storage system includes a block provider providing host computer access to the LUNs and a cloud appliance providing access to the cloud storage system, the cloud appliance including a volume-to-object translator providing the cloud-backed LUN using respective logical mappings to corresponding sets of objects.

5. The method of claim 4, wherein the cloud appliance further includes a LUN maintenance and orchestration unit (LNMO) and one or more cloud application program interfaces (APIs), the LNMO initiating and controlling the archiving of the local LUN, the cloud APIs managing communications with the cloud storage system.

6. The method of claim 1, wherein identifying the data content differences includes using a snap difference operation comparing data contents of the baseline local snapshot to the subsequent local snapshot to generate a difference map, the difference map identifying (1) all data blocks of the subsequent local snapshot that represent additions or modifications over contents of the baseline snapshot, and (2) all data blocks that represent deallocations or deletions from the baseline local snapshot.

7. A method of archiving local logical units of data storage (LUNs) to cloud storage, the local LUNs residing on local physical storage of a data storage system, comprising:
    establishing a mirror between a local LUN and a cloud-backed LUN backed by cloud physical storage of a separate cloud storage system, the mirror making data contents of the cloud-backed LUN identical to data contents of the local LUN;
    upon the mirror being established, then (a) depositing a stub on the local LUN, the stub indicating that the local LUN has been archived and identifying the cloud-backed LUN as the target of subsequent IOs to the local LUN, and (b) releasing local physical storage of the local LUN for allocation to other local LUNs; and
    for subsequent IOs to the local LUN, based on the presence of the stub, satisfying the IOs from the cloud-backed LUN,
    wherein the data storage system includes a block provider providing host computer access to the LUNs and a cloud appliance providing access to the cloud storage system, the cloud appliance including a volume-to-object translator providing the cloud-backed LUN using respective logical mappings to corresponding sets of objects, and further including maintaining connections between the block provider and the cloud appliance including a data transfer channel and a control channel, the data transfer channel employing a block storage protocol, the control channel being structured for more general-purpose communications including exchanging out-of-band requests and corresponding responses.

8. The method of claim 7, wherein the data transfer channel is an iSCSI channel, and the control channel utilizes a representation state transfer (REST) interface.

9. The method of claim 7, wherein the block provider and cloud appliance are included in respective virtual machines of a single server computer.

10. The method of claim 7, further including steps of a restore process by which a production local LUN is restored from a corresponding cloud-backed LUN, the steps including:
    initiating a copy of the cloud-backed LUN into the local LUN;
    processing IOs during the copy, including (1) caching writes locally and selectively destaging write data to the cloud-backed LUN depending on an offset address of the write data relative to a copy cursor using in the copy process, and (2) serving reads from either the local LUN or the cloud-backed LUN based on an offset address relative to the copy back cursor and whether the read data has been cached locally; and
    once the copy is complete, removing the stub from the local LUN and deleting the cloud-backed LUN, making the local LUN locally backed and ready for full performance usage.

11. A data storage system having local physical storage, a computer-implemented block provider, and a computer-implemented cloud appliance, the block provider storing local logical units of data storage (LUNs) on the local physical storage, the block provider and cloud appliance being configured and co-operative to archive the local LUNs to cloud storage by:
    establishing a mirror between a local LUN and a cloud-backed LUN backed by cloud physical storage of a separate cloud storage system, the mirror making data contents of the cloud-backed LUN identical to data contents of the local LUN;
    upon the mirror being established, then (a) depositing a stub on the local LUN, the stub indicating that the local LUN has been archived and identifying the cloud-backed LUN as the target of subsequent IOs to the local LUN, and (b) releasing local physical storage of the local LUN for allocation to other local LUNs; and
    for subsequent IOs to the local LUN, based on the presence of the stub, satisfying the IOs from the cloud-backed LUN,
    and additionally performing steps of a restore process by which a production local LUN is restored from a corresponding cloud-backed LUN, the steps including:
        initiating a copy of the cloud-backed LUN into the local LUN;
        processing IOs during the copy, including (1) caching writes locally and selectively destaging write data to the cloud-backed LUN depending on an offset address of the write data relative to a copy cursor using in the copy process, and (2) serving reads from either the local LUN or the cloud-backed LUN based on an offset address relative to the copy back cursor and whether the read data has been cached locally; and once the copy is complete, removing the stub from the local LUN and deleting the cloud-backed LUN, making the local LUN locally backed and ready for full performance usage.

12. The data storage system of claim 11, wherein the cloud storage system supports storage of searchable metadata elements usable to associate cloud-backed LUNs with corresponding LUNs of the data storage system.

13. The data storage system of claim 12, wherein each searchable metadata element for a respective cloud-backed LUN includes a LUN name, a LUN identifier, a version number, and a timestamp, the LUN name being a name of the local LUN corresponding to the cloud-backed LUN, the LUN identifier being an identifier of the local LUN, the version number indicating a version of the local LUN, and the timestamp including a date and time when the cloud-backed LUN was created.

14. The data storage system of claim 11, wherein the cloud appliance includes a volume-to-object translator providing the cloud-backed LUN using respective logical mappings to corresponding sets of objects.

15. The data storage system of claim 14, wherein the cloud appliance further includes a LUN maintenance and orchestration unit (LNMO) and one or more cloud application program interfaces (APIs), the LNMO initiating and controlling the archiving of the local LUN, the cloud APIs managing communications with the cloud storage system.

16. The data storage system of claim 11, wherein identifying the data content differences includes using a snap difference operation comparing data contents of the baseline local snapshot to the subsequent local snapshot to generate a difference map, the difference map identifying (1) all data blocks of the subsequent local snapshot that represent additions or modifications over contents of the baseline snapshot, and (2) all data blocks that represent deallocations or deletions from the baseline local snapshot.

17. A data storage system having local physical storage, a computer-implemented block provider, and a computer-implemented cloud appliance, the block provider storing local logical units of data storage (LUNs) on the local physical storage, the block provider and cloud appliance being configured and co-operative to archive the local LUNs to cloud storage by:
  establishing a mirror between a local LUN and a cloud-backed LUN backed by cloud physical storage of a separate cloud storage system, the mirror making data contents of the cloud-backed LUN identical to data contents of the local LUN;
  upon the mirror being established, then (a) depositing a stub on the local LUN, the stub indicating that the local LUN has been archived and identifying the cloud-backed LUN as the target of subsequent IOs to the local LUN, and (b) releasing local physical storage of the local LUN for allocation to other local LUNs; and
  for subsequent IOs to the local LUN, based on the presence of the stub, satisfying the IOs from the cloud-backed LUN,
  the data storage system further including connections between the block provider and the cloud appliance including a data transfer channel and a control channel, the data transfer channel employing a block storage protocol, the control channel being structured for more general-purpose communications including exchanging out-of-band requests and corresponding responses.

18. The data storage system of claim 17, wherein the data transfer channel is an iSCSI channel, and the control channel utilizes a representation state transfer (REST) interface.

19. The data storage system of claim 17, wherein the block provider and cloud appliance are included in respective virtual machines of a single server computer.

20. The data storage system of claim 17, wherein the block provider and cloud appliance are further configured and co-operative to perform steps of a restore process by which a production local LUN is restored from a corresponding cloud-backed LUN, the steps including:
  initiating a copy of the cloud-backed LUN into the local LUN;
  processing IOs during the copy, including (1) caching writes locally and selectively destaging write data to the cloud-backed LUN depending on an offset address of the write data relative to a copy cursor using in the copy process, and (2) serving reads from either the local LUN or the cloud-backed LUN based on an offset address relative to the copy back cursor and whether the read data has been cached locally; and
  once the copy is complete, removing the stub from the local LUN and deleting the cloud-backed LUN, making the local LUN locally backed and ready for full performance usage.

* * * * *